United States Patent

Bryant

(10) Patent No.: US 11,900,674 B2
(45) Date of Patent: Feb. 13, 2024

(54) SYSTEM FOR REAL-TIME IDENTIFICATION OF UNAUTHORIZED ACCESS

(71) Applicant: BANK OF AMERICA CORPORATION, Charlotte, NC (US)

(72) Inventor: Matthew K. Bryant, Gastonia, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 292 days.

(21) Appl. No.: 17/370,343

(22) Filed: Jul. 8, 2021

(65) Prior Publication Data

US 2023/0008454 A1 Jan. 12, 2023

(51) Int. Cl.
G06V 20/20 (2022.01)
G06N 20/00 (2019.01)
G06F 18/214 (2023.01)

(52) U.S. Cl.
CPC .......... G06V 20/20 (2022.01); G06F 18/214 (2023.01); G06N 20/00 (2019.01)

(58) Field of Classification Search
CPC ...... G06F 18/214; G06F 21/00; G06F 21/554; G06F 18/217; G06F 21/577; G06N 20/00; G06V 20/20; G06V 20/52; G06V 20/44; G06V 10/7784; G06V 10/225; G06V 40/172; H04L 63/20; H04L 63/1416; H04L 63/10
See application file for complete search history.

(56) References Cited

U.S. PATENT DOCUMENTS

| | | | |
|---|---|---|---|
| 5,502,764 A | 3/1996 | Naccache |
| 5,826,011 A | 10/1998 | Chou et al. |
| 5,844,497 A | 12/1998 | Gray |
| 5,933,498 A | 8/1999 | Schneck et al. |
| 5,935,246 A | 8/1999 | Benson |
| 5,940,504 A | 8/1999 | Griswold |
| 5,956,404 A | 9/1999 | Schneier et al. |
| 5,987,134 A | 11/1999 | Shin et al. |
| 6,008,737 A | 12/1999 | Deluca et al. |
| 6,009,401 A | 12/1999 | Horstmann |
| 6,009,525 A | 12/1999 | Horstmann |
| 6,021,438 A | 2/2000 | Duvvoori et al. |

(Continued)

*Primary Examiner* — Xilin Guo
(74) *Attorney, Agent, or Firm* — Moore & Van Allen PLLC; Anup Shrinivasan Iyer

(57) ABSTRACT

Systems, computer program products, and methods are described herein for real-time identification of unauthorized access. The present invention is configured to receive, from a first computing device, an indication of a first triggering activity; extract one or more first assessment vectors associated with the first triggering activity; receive, from a second computing device, an indication of a second triggering activity; extract one or more second assessment vectors associated with the second triggering activity; determine, in real-time, that the one or more first assessment vectors and the one or more second assessment vectors indicate an incidence of a misappropriate activity; dynamically generate, using an augmented reality application, an augmented reality overlay comprising at least the one or more first assessment vectors, the one or more second assessment vectors, and an indication of the incidence of the misappropriate activity.

20 Claims, 2 Drawing Sheets

(56) References Cited

U.S. PATENT DOCUMENTS

| | | | |
|---|---|---|---|
| 6,023,766 | A | 2/2000 | Yamamura |
| 6,029,145 | A | 2/2000 | Barritz et al. |
| 6,035,402 | A | 3/2000 | Vaeth et al. |
| 6,047,242 | A | 4/2000 | Benson |
| 6,049,789 | A | 4/2000 | Frison et al. |
| 6,067,582 | A | 5/2000 | Smith et al. |
| 6,073,123 | A | 6/2000 | Staley |
| 6,078,909 | A | 6/2000 | Knutson |
| 6,101,606 | A | 8/2000 | Diersch et al. |
| 6,128,741 | A | 10/2000 | Goetz et al. |
| 11,126,736 | B2 * | 9/2021 | Levin ................ G06F 21/6218 |
| 2018/0077200 | A1 | 3/2018 | Apvrille |
| 2018/0276896 | A1 | 9/2018 | Launonen |
| 2021/0084077 | A1 * | 3/2021 | Brannon ............... H04L 63/102 |
| 2021/0136066 | A1 * | 5/2021 | Llamas Virgen ..... H04L 63/101 |
| 2021/0280065 | A1 * | 9/2021 | Kwatra .................. G06F 9/542 |
| 2021/0374754 | A1 * | 12/2021 | Pandian ............. G06Q 20/4016 |

* cited by examiner

SYSTEM FOR REAL-TIME IDENTIFICATION OF UNAUTHORIZED ACCESS

FIELD OF THE INVENTION

The present invention embraces a system for real-time identification of unauthorized access.

BACKGROUND

Triggering event logging and monitoring is a process that entities perform by examining electronic logs for indications that unauthorized security-related activities have been attempted or performed on a system or application that processes, transmits, or stores confidential information. Most triggering event logging and monitoring happened in a decentralized manner where teams dedicate resources to monitor and log triggering event specific to them. This often results in teams being removed from observing a potential larger issue (e.g., misappropriate activity).

There is a need for a system for real-time identification of unauthorized access.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for real-time identification of unauthorized access is presented. The system comprising: at least one non-transitory storage device; and at least one processing device coupled to the at least one non-transitory storage device, wherein the at least one processing device is configured to: receive, from a first computing device, an indication of a first triggering activity; extract one or more first assessment vectors associated with the first triggering activity; receive, from a second computing device, an indication of a second triggering activity; extract one or more second assessment vectors associated with the second triggering activity; determine, in real-time, that the one or more first assessment vectors and the one or more second assessment vectors indicate an incidence of a misappropriate activity; dynamically generate, using an augmented reality application, an augmented reality overlay comprising at least the one or more first assessment vectors, the one or more second assessment vectors, and an indication of the incidence of the misappropriate activity; transmit control signals configured to cause the second computing device to display the augmented reality overlay on the second computing device.

In some embodiments, the at least one processing device is further configured to: determine that the misappropriate activity is associated with one or more third assessment vectors, wherein the one or more third assessment vectors is a combination of at least a portion of the one or more first assessment vectors and at least a portion of the one or more second assessment vectors.

In some embodiments, the at least one processing device is further configured to: initiate a machine learning model on the one or more first assessment vectors and the one or more second assessment vectors; and classify, using the machine learning model, the one or more first assessment vectors and the one or more second assessment vectors into a predetermined class label based on at least one or more classification parameters, wherein the predetermined class label is associated with the misappropriate activity.

In some embodiments, the at least one processing device is further configured to: initiate a machine learning algorithm on one or more historical assessment vectors associated with one or more misappropriate activities; train, using the machine learning algorithm, the machine learning model, wherein training further comprises determining the one or more classification parameters for the machine learning model.

In some embodiments, the at least one processing device is further configured to: receive, from the second computing device, an indication to escalate review of the first triggering activity and the second triggering activity based on at least determining the incidence of the misappropriate activity.

In some embodiments, the at least one processing device is further configured to: transmit control signals configured to cause the first computing device to display the one or more first assessment vectors.

In some embodiments, the at least one processing device is further configured to: transmit control signals configured to cause the second computing device to display the one or more second assessment vectors.

In some embodiments, dynamically generating an augmented reality overlay further comprises: generating, using the augmented reality application, one or more first virtual markers corresponding to the one or more first assessment vectors; overlaying, using the augmented reality application, the one or more first virtual markers on the one or more second assessment vectors; and transmitting control signals configured to cause the second computing device to display the one or more second assessment vectors augmented by the one or more first virtual markers.

In another aspect, a computer program product for real-time identification of unauthorized access is presented. The computer program product comprising a non-transitory computer-readable medium comprising code causing a first apparatus to: receive, from a first computing device, an indication of a first triggering activity; extract one or more first assessment vectors associated with the first triggering activity; receive, from a second computing device, an indication of a second triggering activity; extract one or more second assessment vectors associated with the second triggering activity; determine, in real-time, that the one or more first assessment vectors and the one or more second assessment vectors indicate an incidence of a misappropriate activity; dynamically generate, using an augmented reality application, an augmented reality overlay comprising at least the one or more first assessment vectors, the one or more second assessment vectors, and an indication of the incidence of the misappropriate activity; transmit control signals configured to cause the second computing device to display the augmented reality overlay on the second computing device.

In yet another aspect, a method for real-time identification of unauthorized access is presented. The method comprising: receiving, from a first computing device, an indication of a first triggering activity; extracting one or more first assessment vectors associated with the first triggering activity; receiving, from a second computing device, an indication of a second triggering activity; extracting one or more second assessment vectors associated with the second triggering activity; determining, in real-time, that the one or more first assessment vectors and the one or more second assessment vectors indicate an incidence of a misappropriate activity; dynamically generating, using an augmented reality application, an augmented reality overlay comprising at least the one or more first assessment vectors, the one or more second assessment vectors, and an indication of the incidence of the misappropriate activity; transmitting control signals configured to cause the second computing device to display the augmented reality overlay on the second computing device.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
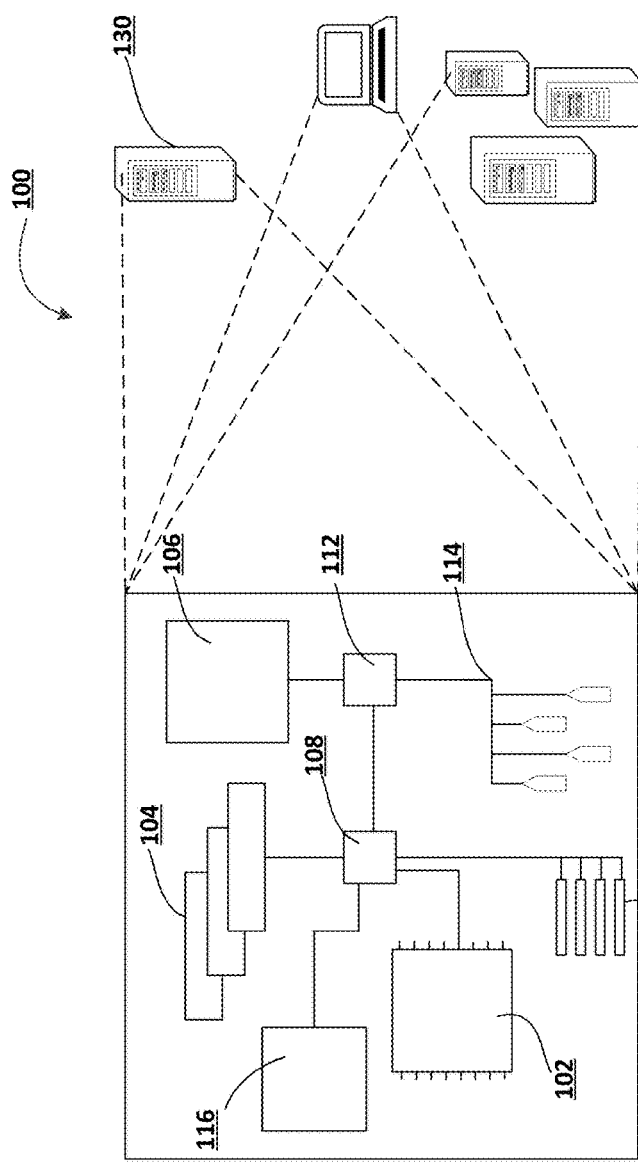
Figure 1:
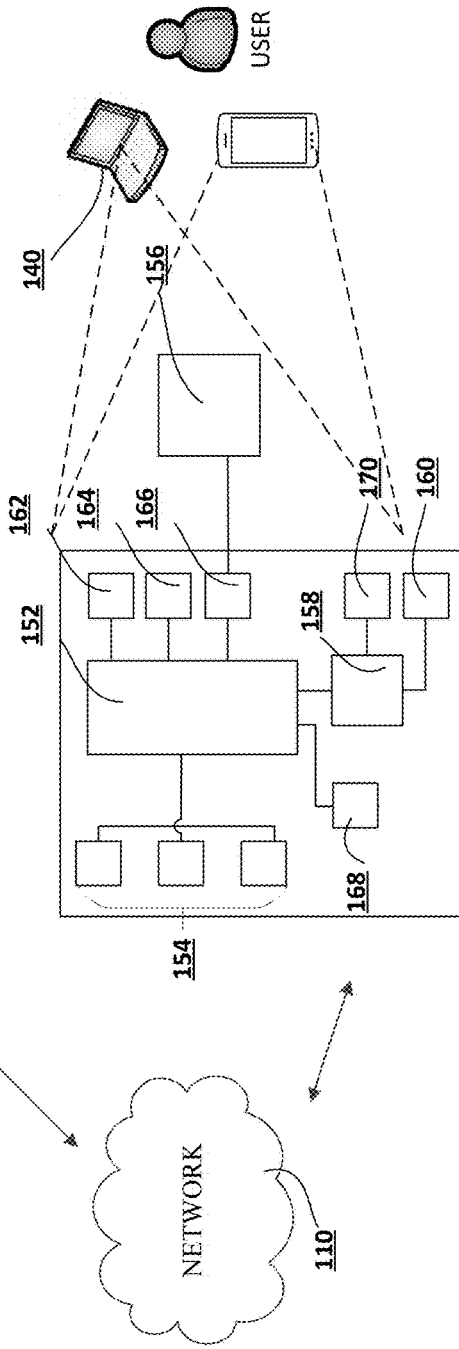
Figure 2:
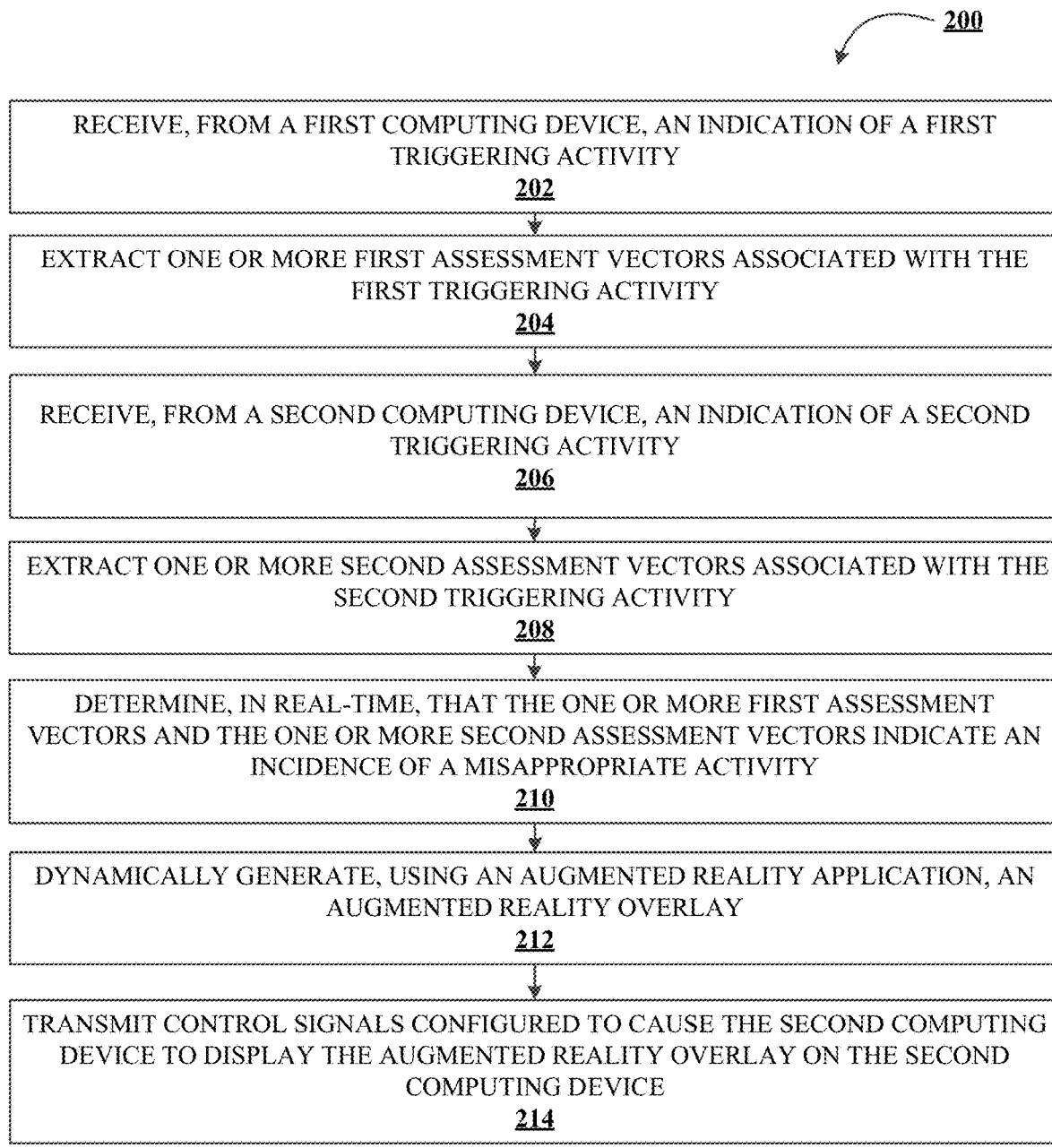

Having thus described embodiments of the invention in general terms, reference will now be made the accompanying drawings, wherein:

FIG. 1 illustrates technical components of a system for real-time identification of unauthorized access, in accordance with an embodiment of the invention;

FIG. 2 illustrates a process flow for real-time identification of unauthorized access, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein.

For example, an interaction may refer to a transfer of data between devices, an accessing of stored data by one or more nodes of a computing cluster, a transmission of a requested task, or the like.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Triggering event logging and monitoring is a process that entities perform by examining electronic logs for indications that unauthorized security-related activities have been attempted or performed on a system or application that processes, transmits, or stores confidential information. Most triggering event logging and monitoring happened in a decentralized manner where teams dedicate resources to monitor and log triggering event specific to them. This often results in teams being removed from observing a potential larger issue (e.g., misappropriate activity). The present invention provides the functional benefit of real-time identification of misappropriate activity (such as unauthorized access) by dynamically augmenting assessment vectors of individual, independent triggering events in an ad-hoc manner until a likelihood threshold of a misappropriate activity happening is reached.

FIG. 1 illustrates technical components of a system for real-time identification of unauthorized access 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon (e.g., the augmented reality application) that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, electronic kiosk devices, blade servers, mainframes, or any combination of the aforementioned. In accordance with embodiments of the invention, the user input system 140 is intended to represent various forms of mobile devices, such as augmented reality (AR) devices, virtual reality (VR) devices, extended reality (XR) devices, personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications (e.g., augmented reality application) to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 130 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 130 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for real-time identification of unauthorized access 200, in accordance with an embodiment of the invention. As shown in block 202, the process flow includes receiving, from a first computing device, an indication of a first triggering activity. Typically, triggering events may be information security events where it is alleged or suspected that unauthorized access, use, modification, or disclosure of printed, electronic, audio, or visual non-public institutional data to an unauthorized individual or entity may have occurred. Examples of triggering events include an indication that access to a proprietary database is no longer working for an authorized user, a file server access speed has reduced by 50% overnight, a spike in incoming or outgoing network traffic across a firewall, configuration changes to a firewall user permission changes to access critical servers, changes to security configurations, unusual behavior from privileged accounts, traffic sent to or from unknown locations, unauthorized insiders trying to access servers and data, unsuccessful access attempts using expired authentication credentials, or the like.

Next, as shown in block 204, the process flow includes extracting one or more first assessment vectors associated with the first triggering activity. Each triggering activity may be associated with a series of actions that identify the triggering activity as such. Such series of actions are referred to as assessment vectors. These assessment vectors may include any metadata associated with the triggering activity such as information about usage and operations of operating systems, applications or devices involved in the triggering activity and their associated attributes. Once the first assessment vectors are extracted, the system may be configured to transmit control signals configured to cause the first computing device to display the one or more first assessment vectors.

Next, as shown in block 206, the process flow includes receiving, from a second computing device, an indication of a second triggering activity. Next, as shown in block 208, the process flow includes extracting one or more second assessment vectors associated with the second triggering activity. Once the second assessment vectors are extracted, the system may be configured to transmit control signals configured to cause the second computing device to display the one or more second assessment vectors.

Next, as shown in block 210, the process flow includes determining, in real-time, that the one or more first assessment vectors and the one or more second assessment vectors indicate an incidence of a misappropriate activity. Misappropriate activity may be information security events that are validated by an internal data incident response as being detrimental to the security of the technology infrastructure and where unauthorized access, use, modification, or disclosure of information has either occurred, or the likelihood of where unauthorized access, use, modification, or disclosure of information occurring is high enough where immediate intervention may be necessary. Each misappropriate activity may be associated with a specific combination of assessment vectors that identify the misappropriate activity as such. In other word, if a portion of the one or more third assessment vectors are identified, then there is a likelihood of misappropriate activity happening. In some embodiments, the specific set of assessment vectors (third assessment vectors) associated with the misappropriate activity may be a combination of at least a portion of the first assessment vectors and at least a portion of the second assessment vectors. Should the combination of the portion of the one or more first assessment vectors and the portion of the second assessment vectors meet the requisite number of third assessment vectors, then there is a likelihood of misappropriate activity happening.

For example, consider that the first user of the first computing device finds that an actor is attempting to access (triggering activity) a proprietary database using expired authentication credentials (assessment vectors) using a computing device with Internet Protocol (IP) address 123.123.123.123 (assessment vector). Due to the nature of the technical infrastructure in entities, it is not uncommon for entities to assign dedicated resources to address specific types of triggering activity. Therefore, it is likely that the first user is associated with a team that deals with identifying, monitoring, and recording access requests to resources within the entity. When a triggering activity occurs, the first user extracts assessment vectors from the triggering activity. However, only assessment vectors that are relevant to that team are used by the first user and the others are recorded and archived. Next, consider that the second user of the second computing device finds that an actor has attempted to send spam emails (triggering activity) to personnel with access to the proprietary database (assessment vector) from the name John Smith (assessment vector) using a computing device with the IP address 123.123.123.123 (assessment vector). Again, as the second user is part of the dedicated team assigned to scan and eliminate spam emails, they may not be aware that it is the same actor attempting to gain access to the same proprietary database. The second user may not be aware that the actor has previously tried to access the proprietary database using expired authentication credentials and may continue to process the email at the dedicated team level. However, the combination of assessment vectors from the first user and the second user may indicate that the actor is attempting an unauthorized access to the proprietary database (misappropriate activity), which may be an issue beyond the scope of either dedicated workforce, and thus may need escalated review.

However, some triggering activities may have numerous assessment vectors associated with them. To process these assessment vectors, in some embodiments, the system may employ machine learning techniques. Accordingly, the system may be configured to initiate a machine learning algorithm on previously known historical assessment vectors (training data) and the associated misappropriate activities (ground truth) they may represent. In response, the system may be configured to train, using the machine learning algorithm, a machine learning model. As described herein, a machine learning model may refer to a mathematical model generated by machine learning algorithms based on sample data, known as training data, to make predictions or decisions without being explicitly programmed to do so. By initiating the machine learning model on previously known historical assessment vectors and the associated misappropriate activities they may represent, the system may be configured to determine one or more classification parameters for the machine learning model.

Once the machine learning model is trained, the system may be configured to initiate the machine learning model on the first assessment vectors and the second assessment vectors. In response, the system may be configured to classify, using the machine learning model, the first assessment vectors and the second assessment vectors into a predetermined class label based on at least classification parameters. Each predetermined class label may be mapped to a known misappropriate activity. In some embodiments, the system may be configured to begin identifying the misappropriate activity using the machine learning model by first initiating the machine learning model on the first assessment vectors. Here, the first assessment vectors form the initial dataset that is used to determine whether a misappropriate activity has occurred. As additional assessment vectors are available (e.g., second assessment vectors), they are incorporated into the dataset in an ad-hoc manner. By adding additional assessment vectors to the dataset as they become available, the machine learning model may be configured to improve the likelihood of identifying the misappropriate activity.

Next, as shown in block 212, the process flow includes dynamically generating, using an augmented reality application, an augmented reality overlay comprising at least the one or more first assessment vectors, the one or more second assessment vectors, and an indication of the incidence of the misappropriate activity.

As described herein, the computing device (e.g., second computing device) of the user may include hardware and software components that are capable of executing the augmented reality application. By executing the augmented reality application thereon, the computing device of the user may be configured to provide the user with an interactive experience with an underlying application (or real-world environment) where objects that reside in the underlying application are enhanced by computer-generated perceptual information, sometimes across multiple sensory modalities, including visual, auditory, haptic, somatosensory, and olfactory. Accordingly, the augmented reality application allows for a virtual layer to be superimposed on top of an existing user interface of the underlying application that the user is currently interacting with to present additional information to the user. In some embodiments, the augmented reality application may continuously remain running as a transparent virtual layer on top of the application (underlying application).

In some embodiments, to generate the augmented reality overlay, the system may be configured to generate, using the augmented reality application, one or more first virtual markers corresponding to the one or more first assessment vectors. Here, the first virtual markers may be computer-generated perceptual elements that are generated to represent the first assessment vectors in the augmented reality overlay. To generate the augmented reality overlay, the system may be configured to overlay the first virtual markers on the display of the second computing device along with the second assessment vectors. In some embodiments, the augmented reality overlay may also include an indication that the presence of the second assessment vectors and the first virtual markers indicates a likelihood of misappropriate activity.

Next, as shown in block 214, the process flow includes transmitting control signals configured to cause the second computing device to display the augmented reality overlay on the second computing device. In some embodiments, in response, the system may be configured to receive, from the second computing device, an indication to escalate review of the first triggering activity and the second triggering activity based on at least determining the incidence of the misappropriate activity.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for real-time identification of unauthorized access, the system comprising:
   at least one non-transitory storage device; and
   at least one processing device coupled to the at least one non-transitory storage device, wherein the at least one processing device is configured to:
   receive, from a first computing device associated with a first user, an indication of a first triggering activity initiated by an external actor;
   extract one or more first assessment vectors associated with the first triggering activity;
   receive, from a second computing device associated with a second user, an indication of a second triggering activity initiated by the external actor;
   extract one or more second assessment vectors associated with the second triggering activity;
   determine, in real-time, that the one or more first assessment vectors and the one or more second assessment vectors indicate an incidence of a misappropriate activity;
   dynamically generate, using an augmented reality application, an augmented reality overlay comprising at least the one or more first assessment vectors, the one or more second assessment vectors, and an indication of the incidence of the misappropriate activity by the external actor; and
   transmit control signals configured to cause the second computing device to display the augmented reality overlay on the second computing device.

2. The system of claim 1, wherein the at least one processing device is further configured to:
   determine that the misappropriate activity is associated with one or more third assessment vectors, wherein the one or more third assessment vectors is a combination of at least a portion of the one or more first assessment vectors and at least a portion of the one or more second assessment vectors.

3. The system of claim 1, wherein the at least one processing device is further configured to:
   initiate a machine learning model on the one or more first assessment vectors and the one or more second assessment vectors; and
   classify, using the machine learning model, the one or more first assessment vectors and the one or more second assessment vectors into a predetermined class label based on at least one or more classification parameters, wherein the predetermined class label is associated with the misappropriate activity.

4. The system of claim 3, wherein the at least one processing device is further configured to:
   initiate a machine learning algorithm on one or more historical assessment vectors associated with one or more misappropriate activities; and
   train, using the machine learning algorithm, the machine learning model, wherein training further comprises determining the one or more classification parameters for the machine learning model.

5. The system of claim 1, wherein the at least one processing device is further configured to:
   receive, from the second computing device, an indication to escalate review of the first triggering activity and the second triggering activity based on at least determining the incidence of the misappropriate activity.

6. The system of claim 1, wherein the at least one processing device is further configured to:
  transmit control signals configured to cause the first computing device to display the one or more first assessment vectors.

7. The system of claim 1, wherein the at least one processing device is further configured to:
  transmit control signals configured to cause the second computing device to display the one or more second assessment vectors.

8. The system of claim 1, wherein dynamically generating an augmented reality overlay further comprises:
  generating, using the augmented reality application, one or more first virtual markers corresponding to the one or more first assessment vectors;
  overlaying, using the augmented reality application, the one or more first virtual markers on the one or more second assessment vectors; and
  transmitting control signals configured to cause the second computing device to display the one or more second assessment vectors augmented by the one or more first virtual markers.

9. A computer program product for real-time identification of unauthorized access, the computer program product comprising a non-transitory computer-readable medium comprising code causing a first apparatus to:
  receive, from a first computing device associated with a first user, an indication of a first triggering activity initiated by an external actor;
  extract one or more first assessment vectors associated with the first triggering activity;
  receive, from a second computing device associated with a second user, an indication of a second triggering activity initiated by the external actor;
  extract one or more second assessment vectors associated with the second triggering activity;
  determine, in real-time, that the one or more first assessment vectors and the one or more second assessment vectors indicate an incidence of a misappropriate activity;
  dynamically generate, using an augmented reality application, an augmented reality overlay comprising at least the one or more first assessment vectors, the one or more second assessment vectors, and an indication of the incidence of the misappropriate activity by the external actor; and
  transmit control signals configured to cause the second computing device to display the augmented reality overlay on the second computing device.

10. The computer program product of claim 9, wherein the first apparatus is further configured to:
  determine that the misappropriate activity is associated with one or more third assessment vectors, wherein the one or more third assessment vectors is a combination of at least a portion of the one or more first assessment vectors and at least a portion of the one or more second assessment vectors.

11. The computer program product of claim 9, wherein the at first apparatus is further configured to:
  initiate a machine learning model on the one or more first assessment vectors and the one or more second assessment vectors; and
  classify, using the machine learning model, the one or more first assessment vectors and the one or more second assessment vectors into a predetermined class label based on at least one or more classification parameters, wherein the predetermined class label is associated with the misappropriate activity.

12. The computer program product of claim 11, wherein the first apparatus is further configured to:
  initiate a machine learning algorithm on one or more historical assessment vectors associated with one or more misappropriate activities; and
  train, using the machine learning algorithm, the machine learning model, wherein training further comprises determining the one or more classification parameters for the machine learning model.

13. The computer program product of claim 9, wherein the first apparatus is further configured to:
  receive, from the second computing device, an indication to escalate review of the first triggering activity and the second triggering activity based on at least determining the incidence of the misappropriate activity.

14. The computer program product of claim 9, wherein the first apparatus is further configured to:
  transmit control signals configured to cause the first computing device to display the one or more first assessment vectors.

15. The computer program product of claim 9, wherein the first apparatus is further configured to:
  transmit control signals configured to cause the second computing device to display the one or more second assessment vectors.

16. The computer program product of claim 9, wherein dynamically generating an augmented reality overlay further comprises:
  generating, using the augmented reality application, one or more first virtual markers corresponding to the one or more first assessment vectors;
  overlaying, using the augmented reality application, the one or more first virtual markers on the one or more second assessment vectors; and
  transmitting control signals configured to cause the second computing device to display the one or more second assessment vectors augmented by the one or more first virtual markers.

17. A method for real-time identification of unauthorized access, the method comprising:
  receiving, from a first computing device associated with a first user, an indication of a first triggering activity initiated by an external actor;
  extracting one or more first assessment vectors associated with the first triggering activity;
  receiving, from a second computing device associated with a second user, an indication of a second triggering activity;
  extracting one or more second assessment vectors associated with the second triggering activity initiated by the external actor;
  determining, in real-time, that the one or more first assessment vectors and the one or more second assessment vectors indicate an incidence of a misappropriate activity;
  dynamically generating, using an augmented reality application, an augmented reality overlay comprising at least the one or more first assessment vectors, the one or more second assessment vectors, and an indication of the incidence of the misappropriate activity by the external actor; and
  transmitting control signals configured to cause the second computing device to display the augmented reality overlay on the second computing device.

18. The method of claim 17, wherein the method further comprises:
- determining that the misappropriate activity is associated with one or more third assessment vectors, wherein the one or more third assessment vectors is a combination of at least a portion of the one or more first assessment vectors and at least a portion of the one or more second assessment vectors.

19. The method of claim 17, wherein the method further comprises:
- initiating a machine learning model on the one or more first assessment vectors and the one or more second assessment vectors; and
- classifying, using the machine learning model, the one or more first assessment vectors and the one or more second assessment vectors into a predetermined class label based on at least one or more classification parameters, wherein the predetermined class label is associated with the misappropriate activity.

20. The method of claim 19, wherein the method further comprises:
- initiating a machine learning algorithm on one or more historical assessment vectors associated with one or more misappropriate activities;
- training, using the machine learning algorithm, the machine learning model, wherein training further comprises determining the one or more classification parameters for the machine learning model.

* * * * *